United States Patent [19]

Kohn et al.

[11] Patent Number: 4,588,377

[45] Date of Patent: May 13, 1986

[54] THERMOCOUPLE PROBE ASSEMBLY

[75] Inventors: Thomas F. Kohn; Lester L. Garland, both of Belding; Eugene D. Nelson, Belmont, all of Mich.

[73] Assignee: Belco Industries, Inc., Belding, Mich.

[21] Appl. No.: 694,596

[22] Filed: Jan. 24, 1985

[51] Int. Cl.$^4$ .................... F27D 19/00; C21B 7/24; G01K 7/00

[52] U.S. Cl. ........................ 432/50; 266/99; 374/163

[58] Field of Search .............. 266/99; 136/221, 223, 136/235; 432/50; 374/163

[56] References Cited

U.S. PATENT DOCUMENTS

| | | | |
|---|---|---|---|
| 2,988,582 | 6/1961 | McGregor et al. | 136/221 |
| 3,055,961 | 9/1962 | Robertson et al. | 136/235 |
| 3,091,119 | 5/1963 | Fischer et al. | 266/99 |
| 3,311,864 | 3/1967 | Walker | 432/50 |

FOREIGN PATENT DOCUMENTS 955093 1/1950 France ..................... 432/250

Primary Examiner—John J. Camby
Attorney, Agent, or Firm—Glenn B. Morse

[57] ABSTRACT

A thermocouple probe assembly for a billet furnace is provided with replaceable contact tips joined to the shanks of the probe rods within a surrounding insulator to inhibit oxidation of the junctions. Two pairs of probes are used, each pair being associated with an independent control circuit as a safety backup system. The assembly is preferably mounted on a bracket that is extendable on an angle forty-five degrees to the horizontal to provide correct probe positioning for various sizes of billets, and has a heat shield correspondingly adjustable along the probe assembly to accommodate various degrees of penetration of the probe assembly into the furnace.

6 Claims, 15 Drawing Figures

THERMOCOUPLE PROBE ASSEMBLY

BACKGROUND OF THE INVENTION

Industrial processes frequently require raising the temperature of large numbers of billets of metal in a continuing operation. The usual billet furnace is essentially a long passageway heated to high temperatures, and traversed by a conveyor. The billets are usually round blocks of metal of essentially the same size, and move down the conveyor in closely-spaced relationship as the temperature is increased to the desired level. Heat is usually supplied by a series of torch-like burners spaced along the passageway closely enough so that temperature variation along the path traveled by the billets can be held close to the desired level or gradient. Since the object of these furnaces is to produce perdetermined temperature conditions within the billets, it has become standard practice to check and control the operation of the furnace by thermocouple probes that are periodically projected into the furnace to engage a particular billet to sense its temperature. Installations of this type are common in connection with aluminum extrusion processes, where it is necessary to raise the billets to a temperature sufficient to allow the extrusion, without the raising the plasticity of the billets to the point where they cannot be handled by the associated automated equipment. It is also obvious that the temperature-sensing function has the effect of preserving the integrity of the furnace itself, as an excess in temperature will usually cause the damage to the lining, housing, or conveyor of the furnace.

A common maintenance problem is encountered in connection with the probe rods. Repeated exposure to the high temperatures of the furnace can produce oxidation of the tips of the probes, which injects an unknown variable to the electrical resistence. Since the probes are usually shoved into the billet hard enough to penetrate the surface slightly, repeated cycles of this action also tend to dull the sharpened points of the probe. A thermocouple produces a small electrical sensing signal as a function of the effect of temperature on probe rods of different material; and minor variations of the resistence at the point of contact will have a serious effect on the magnitude of this signal, resulting in serious problems as the signal is used for the control of the furnace temperature. Maintenance of acceptable conditions at the points of the probes requires repeated sharpening of the probe tips, and ultimately a replacement of the entire probe rods after a relatively short decrease in its length. The conventional practice requires sufficient disassembly of the probe system to get at the rods, followed by either re-grinding the tips, or by the replacement of the entire rods.

The usual arrangement for providing access to the interior of the furnace for the probe assembly is to surround a trap door in the furnace structure with a box-like chamber that can be pressurized to match or coordinate with the pressure conditions within the furnace. The box provides an opening large enough to accommodate the outer cantilever housing of the probe assembly, which is extended through this opening into the chamber, and then through the trap door into the furnace to engage one of the billets. Protection of the equipment associated with the probe assembly requires that the escape of hot gases around the probe assembly housing be kept to a minimum, but practical considerations limit the closeness of the fit that it is possible to maintain at this point. The problems outlined above have generated a maintenance nuisance that is capable of seriously interferring with the operation of the entire system.

SUMMARY OF THE INVENTION

The thermocouple probe assembly has probe rods constructed with a replaceable tip detachably secured to the remaining length of the rod at a position fully surrounded by insulating material to isolate the junction from heat and exposure to air. In the active position of the probe assembly, the entrance of the cantilever portion into the pressure-control box of the furnace is covered to prevent outflow of high temperature gases through the opening surrounding the probe assembly housing. In the preferred form of the invention, two pairs of probes are used within the same insulator, each pair associated with an independent control system for backup.

DESCRIPTION OF THE PREFERRED EMBODIMENTS

Figure 15:
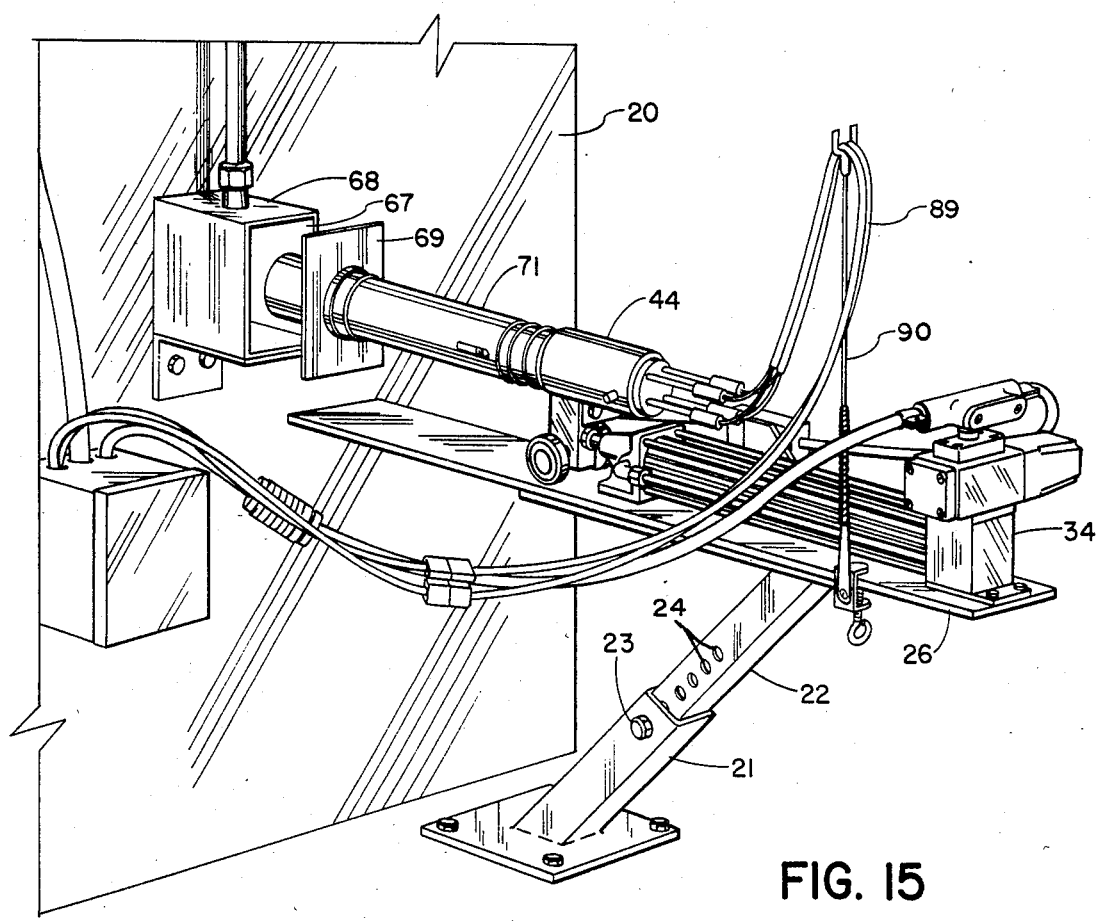
FIG. 15 is a perspective view showing the installation of the probe assembly in conjunction with a billet furnace.

Referring to the drawings, the illustrated probe assembly is shown in FIG. 15 installed in conjunction with the furnace 20. A floor-mounted structure includes the square tube 21 inclined away from the furnace at an angle of forty-five degrees to the horizontal. This arrangement permits billets of various sizes to be engaged near their center. The bracket directly supporting the probe assembly includes the square tube 22 received in telescoping relationship within the exterior tube 21, with the degree of extension adjustably secured by the cross bolt 23 engaging a selected one of the holes 24 in the tube 21. The supporting bracket also includes the horizontal member 25 welded to the end of the tube 22, and providing a platform receiving the probe assembly. The plate 26 forms a base for the assembly; and the left portion of it, as viewed in FIGS. 1 and 2, forms a guideway receiving the rollers 27 and 28 mounted on the carriage body 29 connected solidly by the coupling 30 to the piston rod associated with the cylinder 31. The cylinder end 32 has a base flange bolted to the plate 26 as shown at 33, and the opposite cylinder end member 34 is bolted to the plate 26 as shown at 35. The position of this assembly along the support bracket member 25 is secured by bolts as shown at 36 disposed at any convenient location. The cylinder 31 and its associated components are of standard design, with tie rods as indicated at 37 serving to transfer the pressure-generated forces, and hold the end members 32 and 34 in engagement with the cylinder 31. A valve control 38 is also standard, with pressure conditions being communicated to the left end of the cylinder, as shown in FIGS. 1 and 2, by the conduit 39.

Figure 2:
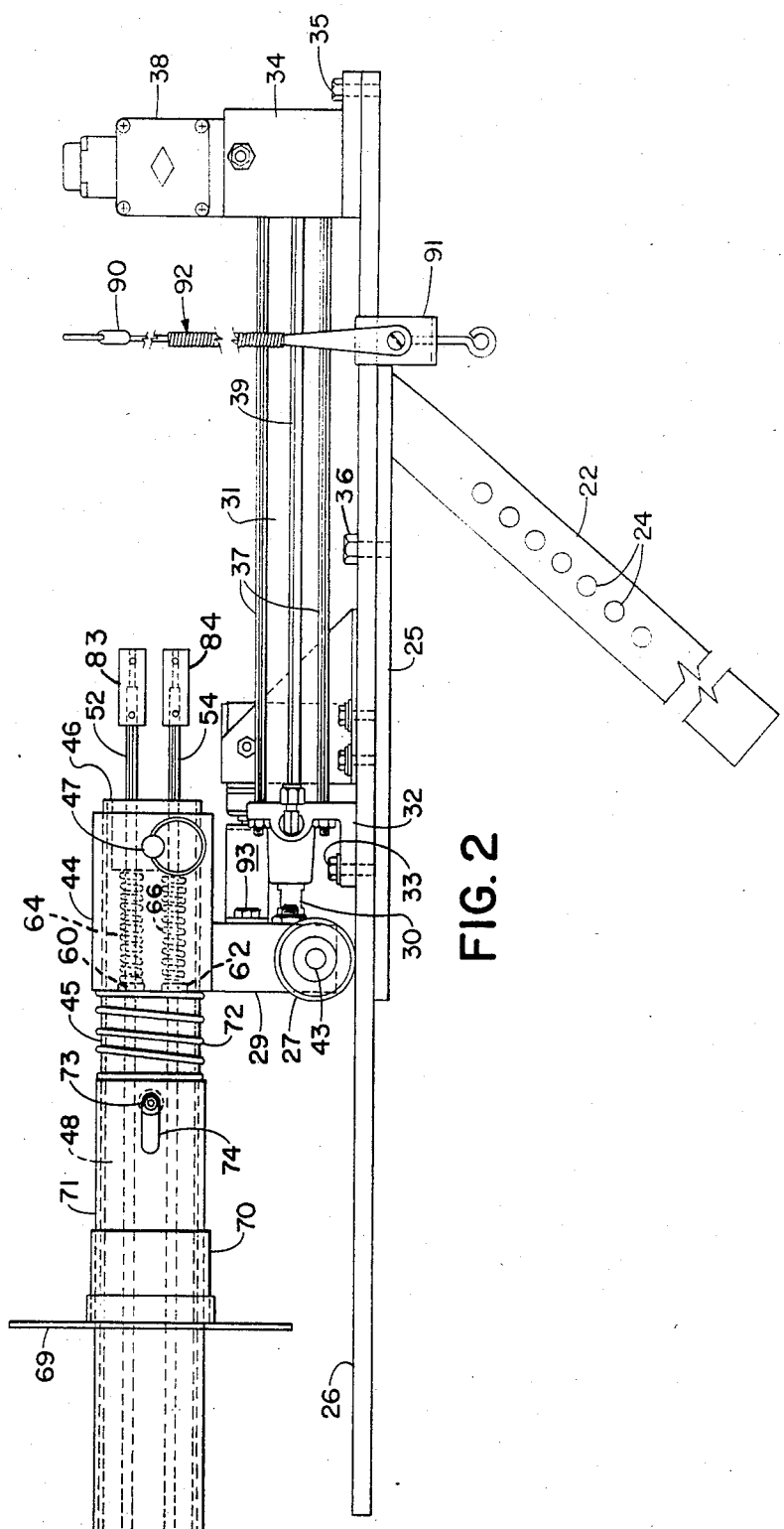
FIG. 2 is a side elevation of the probe assembly illustrated in FIG. 1.
Figure 3:
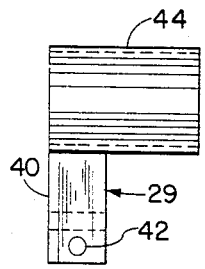
FIG. 3 is a side elevation of the carriage body of the probe assembly.
Figure 4:
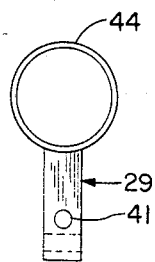
FIG. 4 is an end view with respect to FIG. 3.
Figure 5:
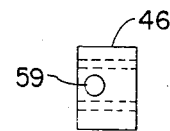
FIG. 5 is a side elevation of the insulating end-plug.
Figure 6:
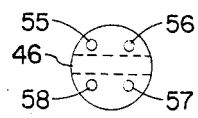
FIG. 6 is an end view with respect to FIG. 5.
Figure 10:
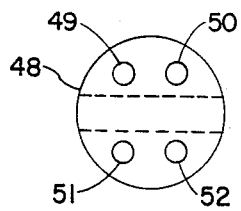
FIG. 10 is an end view with respect to FIG. 9.

Referring to FIGS. 3 and 4, the carriage 29 includes a central vertical block 40 containing the holes 41 for receiving the coupling 30, and 42 for receiving the shaft 43 carrying the rollers 27 and 28. The carriage also includes the sleeve 44 secured to the central member 40, which receives the inner housing tube 45. An end plug 46 of insulating material is slipped into the end of the inner housing tube 45, and the assembled relationship of these components is maintained by the cross-pin 47 traversing the sleeve 44, the inner housing tube 45, and the end plug 46. A cylindrical ceramic insulator 48 is received within the inner housing 45. Referring to FIG. 10, holes as shown at 49-51 extend throughout the length of the insulator for accommodating the two pairs of probe rods, which appear at 52-54 in FIGS. 1 and 2. These rods also traverse the holes 55-58 in the end plug 46, which also has the transverse hole 59 receiving the cross-pin 47.

Figure 1:
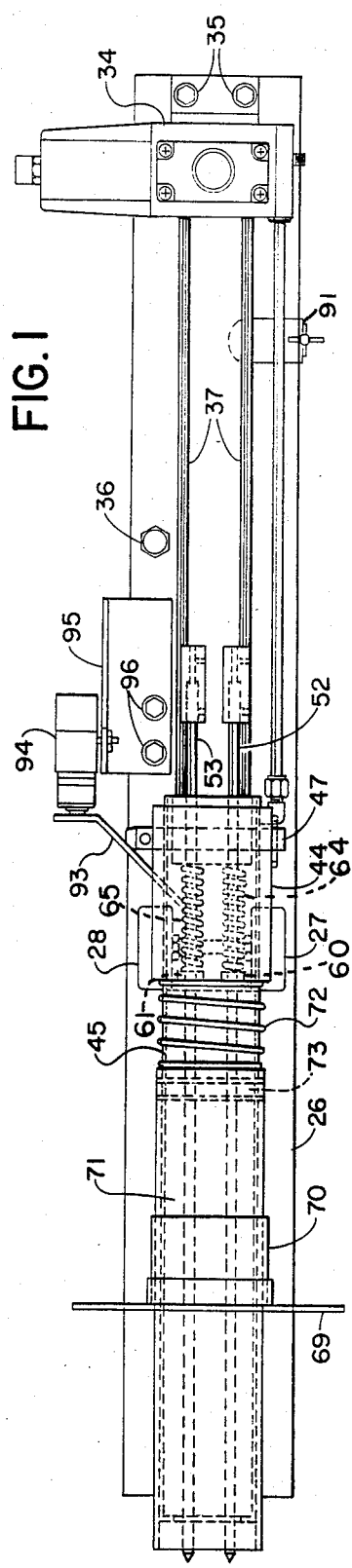
FIG. 1 is a top view of the probe assembly.

Setscrew collars as shown at 60-62 in FIGS. 1 and 2 are installed on each of the probe rods, and serve a dual purpose. They serve as abutments for the compression springs 64-66 extending between these collars and the end of the plug 46 to bias the probe rods to the left, as shown in FIGS. 1 and 2. As the carriage 29 is shoved to the left under the action of the cylinder 31, the cantilever inner housing 45 carrying the insulator 48 and the probe rods is shoved into the opening 67 of the pressurized box 68 surrounding an access door (not shown) in the furnace 20. The pressure control within the box prevents the opening of the door from interferring with the conditions within the furnace, and also prevents the outflow of hot gases and flame. The movement of the carriage ultimately results in the engagement of a hot billet in the furnace with the tips of the probe rods, and a consequent detection of the temperature conditions in that billet. Just prior to the final extended position of the probe assembly, the heat shield 69 bears against the outer face of the pressurized box 68 to seal off the space between the opening 67 and the inner housing 45. The heat shield 69 has a collar 70 secured in any convenient fashion to the outer housing 71, which is a tubular sleeve in sliding engagement with the outer surface of the inner housing 45, and biased to the left by the spring 72. A cross bolt 73 traverses the outer housing and also the insulator 48, and is received within elongated slots in the outer housing as shown at 74 in FIG. 2. The freedom of axial sliding movement of the outer housing with respect to the inner housing is thus determined by the presence of the ends of the bolt 73 within the slots 74. This interengagement also prevents relative rotation between the inner and outer housings.

Figure 7:
FIG. 7 is a side elevation of a complete probe rod.
Figure 8:
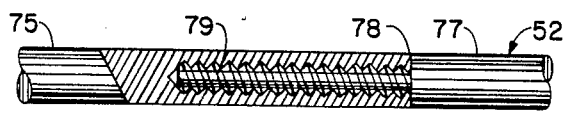
FIG. 8 is an enlarged view with respect to FIG. 7, showing the junction of the shank and tip of the probe rod.
Figure 9:
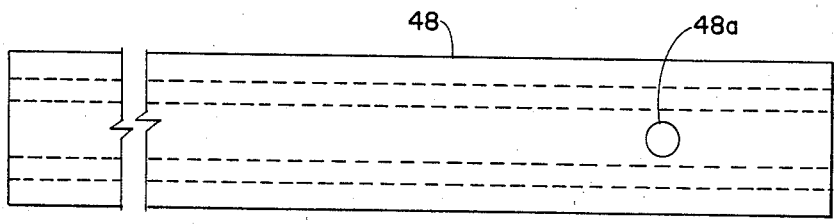
FIG. 9 is a side elevation of the principal insulator of the probe assembly.
Figure 11:
FIG. 11 is a side elevation of one of the probe couplings.
Figure 12:
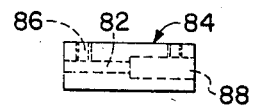
FIG. 12 is a side elevation showing another of the probe couplings, FIGS. 11 and 12 representing the couplings of a particular pair of probes.
Figure 13:
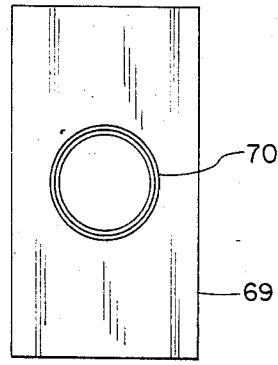
FIG. 13 is an end view of the heat shield.
Figure 14:
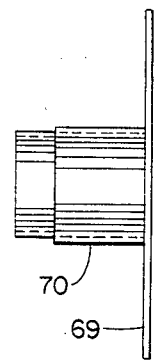
FIG. 14 is a side elevation with respect to FIG. 13.

Referring to FIGS. 7 and 8, the probes are a two-piece assembly. The tip section 75 with the sharpened point 76 is detachably secured to the shank 77 at the junction 78 by the engagement of the threaded extension 79 on the shank engaging a corresponding threaded opening in the tip section 75. This junction is well within the protective confines of a insulator 48 at all times. The tip section 75 may be unscrewed from the left end of the probe assembly during periods in which it is withdrawn from the furnace, without any further disassembly being required. The tip may then be reground, or replaced. The cost of the material represented by the length of the shank 77 (which is of a material selected for thermocouple characteristics) is thus saved, together with a very considerable amount of time involved in performing this operation. The shanks of the probes have a portion of reduced diameter as indicated at 80 in FIG. 7 for engagement with the bore 81 or 82 of the couplings 83 or 84 shown in FIGS. 11 and 12, respectively. These couplings are provided with threaded holes as shown at 85 and 86 for receiving setscrews to secure the couplings on the ends 80 of the probe shanks. At the opposite ends of the couplings, the holes 87 and 88 are coaxial with the holes 81 and 82, and of larger diameter. The holes 87 and 88 are of different diameters, and are adapted to receive the ends of wire connectors of diameters selected to fit the holes 87 and 88 closely enough to distinguish one from the other, and thus to preserve the polarity of the electrical connections. The electrical harnesses associated with these connections are shown generally at 89 in FIG. 15.

During the extension and retraction of the probe assembly by the cylinder 31, these harnesses are formed in a loop suspended by the resilient arm 90, the base of which is clamped to the plate 26 as shown at 91. A portion of the length of the arm 90 is formed by the coil spring 92, permitting substantial deflection during the extremes of movement of the carriage 29, without inducing sharp bends in the electrical harnesses, and without dragging them over the surrounding structure. In these cycles of movement, the retracted position of the probe assembly shown in FIGS. 1 and 2 is controlled by the engagement of the actuator 93 bolted to the carriage 29, and extending to a point where it can engage the operating point of the switch 94 mounted on the bracket 95 bolted to the plate 26 as shown at 96. The switch 94 will control appropriate valves in the structure 34, which determines the pressure conditions within the cylinder 31. The conventional electrical connections between these points are not shown.

We claim:

1. A thermocouple probe assembly for sensing the temperature of heated billets, including guideway means adapted to extend toward and away from a billet position, carriage means moveable on said guideway in response to an actuator, said assembly also including elongated insulating means, and probe electrodes mounted on said carriage and extending through said insulating means toward said billet position, wherein the improvement comprises:

a construction of said probe electrodes in which relatively short replaceable tip sections are respectively joined to permanent shank sections in threaded engagement at junctions disposed within said insulating means, one of said sections having an exteriorly threaded end portion engageable with an interiorly threaded end portion on the other of said sections whereby the exterior diameter of said sections remains constant.

2. An assembly as defined in claim 1, additionally including a mounting structure having telescoping inner and outer members disposed on a substantially forty-five degree incline to the horizontal, locking means for securing a predetermined degree of telescoping extension, one of said telescoping members being secured to said guideway.

3. An assembly as defined in claim 1, additionally including a housing surrounding said insulating means, and a heat shield plate mounted on said housing transversely with respect to said guideway.

4. An assembly as defined in claim 3, wherein said housing is cylindrical, and said heat shield plate has a collar slideably adjustable along said housing.

5. In combination with a billet furnace having an access door and surrounded by a pressurized chamber having an opening, a thermocouple probe assembly including a guideway extending toward and away from said opening and a carriage moveably mounted along said guideway and having a cantilever housing containing probe means adapted to project into said furnace, wherein the improvement comprises:

a heat shield mounted on said housing and adapted to shield the portion of said opening surrounding said housing on projection of said housing therein.

6. A combination as defined in claim 5, wherein said housing is resiliently retractable with respect to said probe assembly, and said heat shield is disposed to bear against said chamber on inward projection of said probe assembly.

* * * * *